April 14, 1959
J. H. KEATING
2,882,142
METHOD OF MELTING ALUMINUM INGOTS
Filed Aug. 31, 1954
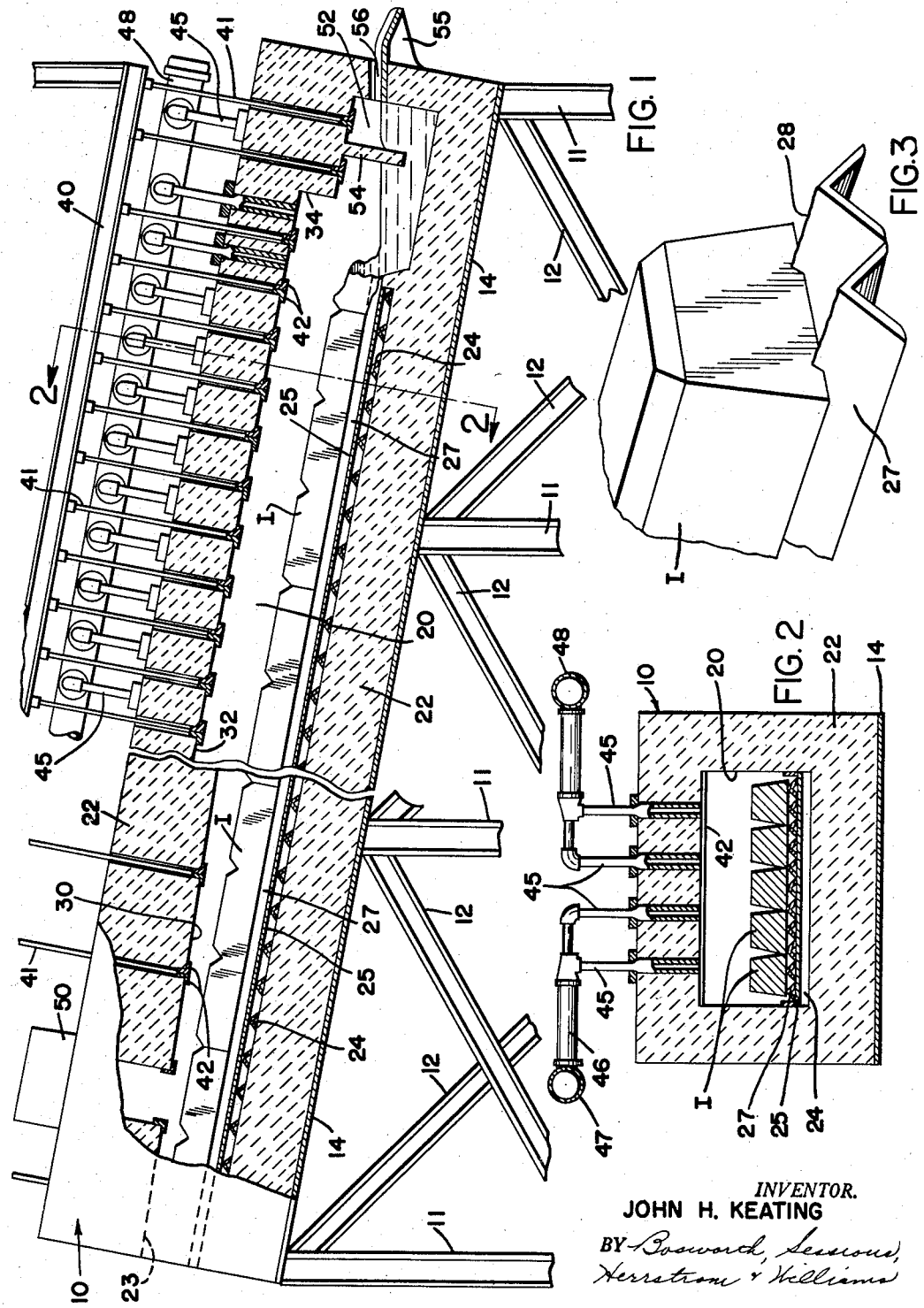
INVENTOR.
JOHN H. KEATING
BY Bosworth, Sessions,
Herrstrom & Williams
ATTORNEYS United States Patent Office 2,882,142
Patented Apr. 14, 1959

2,882,142

METHOD OF MELTING ALUMINUM INGOTS

John H. Keating, Cleveland, Ohio, assignor to Monarch Aluminum Mfg. Company, Cleveland, Ohio, a corporation of Ohio Application August 31, 1954, Serial No. 453,270

1 Claim. (Cl. 75—68)

This invention relates to a method and apparatus for melting aluminum.

It has been found that in melting aluminum preparatory to casting, and particularly when melting aluminum ingots, the presence of aluminum oxide scale on the exterior retarded the rate at which the ingot was reduced to molten metal by methods heretofore practiced.

It has been found that, when exposed to oxygen, aluminum will rapidly acquire an oxide skin which tends to hold together at temperatures as high as 4000° F. although the aluminum inside the skin may be almost entirely molten, the melting point of pure aluminum being 1220° F. It has further been found that the rate at which aluminum is normally melted is such that the melting temperature is not reached immediately after the first heat is applied and that as the temperature of the ingot approaches the melting point, the heat imparted to the outside, together with the presence of oxygen, tends to increase the amount and thickness of the oxide skin up to the time when the complete ingot is melted. It has been found that in melting, aluminum will absorb heat at a given rate and no faster and, furthermore, that as the temperature of the molten aluminum is raised substantially above its melting point, the grain structure of the aluminum as finally cast is inferior to that of aluminum which has not been so highly treated.

The general object of the present invention is to provide a method and apparatus for melting aluminum by confining the aluminum ingot in a substantially closed furnace, such that the admission of free oxygen from the surrounding atmosphere is substantially eliminated and when the ingot is at heat, fracturing or cutting the aluminum oxide coating to release the molten metal inside which may be ready to flow but is retarded by the coating. A further object of the invention is to provide for preheating aluminum ingots in a controlled atmosphere so that the formation of oxide is not aggravated during the preheating period. Still another object is to provide within the furnace a sharp cutting edge and moving the ingot and the edge relative to each other thus fracturing the oxide skin to permit escape of the purer metal from the interior. Still an additional object of the invention is to provide a furnace through which ingots are moved past a preheating zone to raise their temperature to a point just below the melting point of the unoxidized metal and thereafter rapidly heating the metal to above its melting point and rupturing the oxide coating of the exterior to permit the free flow of the molten metal inside.

The furnace by which the method and apparatus of the present invention may be practiced is disclosed in my co-pending application, Serial No. 442,661, filed July 12, 1954. The disclosure of that application is incorporated herein by reference.

Referring now to the drawings:

Figure 1 is a side elevation of a furnace embody the present invention and its method of use.

Figure 2 is a section through Figure 1 as indicated by the lines 2—2 thereon.

Figure 3 is a detail view illustrating how inverted steel angle bars may be used to provide a cutting edge for rupturing the oxide coating.

Generally, the invention comprises an elongated furnace entirely lined with fire brick and provided with a steel floor. The steel floor includes a series of steel angle bars extending lengthwise of the furnace, along with the ingots side. At the end of the angle bar structure is a reservoir in which the molten metal is deposited, and the entire furnace is mounted at an angle so that any molten metal flows by gravity into the reservoir. The roof structure of the furnace includes a series of gas burners so arranged that they are concentrated in greatest number at the lower or melting end. They not only discharge heat onto the ingots themselves but raise the interior walls of the furnace to a temperature above the melting point of aluminum. As a result, the ingots are placed in a region where they are subjected to infrared heat, thus heating the interior of the ingot at the same time the exterior or oxide skin is heated. The roof of the furnace drops toward the entrance end so that the intake opening area is substantially no larger than required to admit the ingots, and as the furnace is operated, the last ingots to be put in the furnace remain in and substantially close this opening.

The burners are adjusted to provide complete combustion so that the interior of the furnace has a controlled atmosphere that is filled with carbon dioxide and no appreciable uncombined oxygen. The result is to provide an atmosphere which prevents oxidation of the ingots as they are heated in the furnace. Further, the burners are so arranged that the hot, burnt gases pass from the melting zone up over the last ingots to be added to heat them directly and also heat them indirectly by heating the furnace walls in what is defined as the preheating zone. The gas is then discharged through a suitable stack.

Referring now to the drawings, the furnace is generally indicated at 10. It is mounted on a structural iron framework having a series of supporting I beam posts 11 and suitable cross bracing 12. The furnace proper is mounted on a strucutral steel bed 14 carried on the posts 11. The furnace is in the form of a tunnel 20 which is enclosed on top, bottom and sides by fire bricks 22. It is open at the receiving end 23 and extends in an inclined position downwardly to the pouring end. The floor of the furnace is supported on a fire brick base and comprises a series of angle irons 24 laid transversely of the furnace on the fire brick with their corners facing up and supporting a steel plate 25. On top of plate 25 are a series of angle members 27 positioned as shown in Figures 2 and 3, closely adjacent each other, with their corner edges 28 (Figure 3) facing upwardly and extending from the receiving end 23 into the region in which the ingots I are melted. The use of the word ingot is intended to mean aluminum in any solid form of substantial width, breadth and height in condition for melting.

The ingots that ride along edges 28 are relatively heavy and as they heat and become soft, the force of gravity causes the tiny serrations that are formed at the time the angle members 27 are rolled to cut and rupture the oxide coating on the underside of the ingots. This cutting does not take place until after the ingots have entered the melting zone and the interior of the ingot has softened. It is believed this softening causes the ingot to fold somewhat over the edge 28 (Figure 3) and facilitate the cutting action. I have found that edges 28 of certain rolled angle members are sufficiently jagged as they come from the mill to provide the necessary cutting action, but small teeth could actually be cut along edges 28 to increase the cutting or sawing effect.

The roof of the furnace is also made of fire brick and is sloped with respect to the furnace floor as shown at 30 so that the floor to roof height is substantially less at the furnace mouth 23 than at an intermediate point 32. From point 32 to point 34 the height is constant and from point 34 adjacent the holding pot, the furnace roof is dropped as shown in Figure 1. The region 34 provides a vertical face that tends to deflect heat away from it up the furnace toward opening 23. The entire roof structure is supported from one or more steel beams 40 by supports 41 that pass through the roof and are secured to stainless steel angle members 42 placed back to back so their flanges extend across the furnace and under the adjacent rows of brick (Figure 1).

The furnace is heated by a gas-fired system. Such system takes the form of a series of gas combustion nozzles 45 extending into the tunnel along the roof thereof and connected by suitable piping 46 to two manifolds 47 and 48 (Figure 2) mounted along the sides of the furnace. The manifolds connect to a mixing chamber where air and gas are mixed in proper proportions to insure essentially complete combustion in the furnace with no appreciable free oxygen remaining. The gas nozzles 45 are concentrated at the lower end of the furnace, between the pouring end and point 32, where the actual melting and holding of the molten metal takes place and are so arranged that the hot gases of combustion first impinge on the ingots at the melting area and then pass upwardly through the narrowing part of the tunnel to be discharged either at the open receiving end or, more preferably, through a stack 50 adjacent the receiving end. The combustion gases not only heat the ingots but raise the temperature of the fire brick lining to a temperature above that required to melt the aluminum. This heated lining supplies most of the heat, as infra-red, that penetrates and heats the inside of the ingots, as distinguished from heat applied to the ingot surface to pass by conduction to the inside of the ingot, particularly as the aluminum oxide is a poor heat conductor.

As a result of the burner location in the furnace, a novel method of melting is attained. The ingots are preheated as they are gradually fed down the inclined tunnel into the melting zone until adjacent point 32 they reach a temperature just below the melting point. They then pass into the melting zone and without appreciable further movement of the ingots themselves are rapidly raised to a temperature at which the metal inside the ingot melts, the temperature remaining below that at which the oxide skin breaks up.

During this period and after, the furnace is periodically charged at 23 with more ingots. Moving of new ingots into the furnace is accomplished manually or by use of the charging mechanism shown in my co-pending application referred to above. The movement of the new ingots pushes those already in the furnace ahead of them along the edges 28 of rails 27. Those ingots so pushed, which are heated enough and are soft enough, are cut on their undersides by edges 28 and the oxide film is thus ruptured or broken. The result is that the oxide envelope collapses and the molten metal inside is released to flow away. The metal so released flows into a holding pot or reservoir 52.

Due to the fact that aluminum oxidizes rapidly, particularly at elevated temperatures, it is important that the melting and holding be accomplished in a non-oxidizing atmosphere. This result is attained by closing off opening 23 with unmelted ingots and by adjusting the combustion mixture so that substantially all of the oxygen present is consumed and passes in the form of carbon dioxide up along the furnace incline and out of stack 50.

As the ingots are melted, the molten metal passes into the small holding reservoir shown at 52. The metal in the reservoir is subject to heat from a limited number of gas nozzles 45 and is thereby maintained in molten condition. A baffle or skim gate 54, made of fire brick and suitably supported as an arch, extends from one side of the furnace to the other and from the tunnel top to somewhat below the liquid level in the reservoir to hold back surface scum from the top of the metal in the pot 52 and to assist in reflecting heat into the melting zone. The level of liquid metal in the pot is governed by the position of a pouring spout 55 which communicates therewith through an opening 56 in the fire brick forming the end of the furnace.

After the ingots have been melted and the metal flows into the reservoir 52, its level will fluctuate somewhat, and as the molten metal rises in the reservoir, it flows out through the opening 56 and is directed by the spout 55 into a suitable pouring ladle as, for example, that described in my co-pending case referred to above.

It is to be understood that while only one embodiment of the invention is shown herein, this embodiment is by way of example only and is not to be construed in a limiting sense. Other arrangements and modifications will occur to those skilled in the art and may be resorted to without departing from the scope of the invention.

Having described my invention, what I claim as new and novel is:

The method of melting aluminum ingots having acquired skins of aluminum oxide comprising the steps of moving said ingots in abutting end to end contact downwardly along a path inclined to the horizontal through a non-oxidizing atmosphere in a pre-heating zone to elevate their temperatures to a point just below the melting point of pure unoxidized aluminum, passing said ingots in abutting end to end contact into a gaseous melting zone and rapidly heating the pure oxidized aluminum to above its melting point, sliding the said ingots over a supporting surface including a cutting edge aligned in the direction of movement of said ingots until the oxide skin of the leading ingot is penetrated, permitting the pure unoxidized aluminum of the leading ingot to escape from its aluminum oxide skin into a holding reservoir, and thereafter skimming the aluminum oxide of each succeeding ingot from the surface of said holding reservoir.

References Cited in the file of this patent

UNITED STATES PATENTS

| | | |
|---|---|---|
| 1,788,185 | Beck et al. | Jan. 6, 1931 |
| 1,810,535 | Schmeller | June 16, 1931 |
| 1,904,781 | Crawford | Apr. 18, 1933 |
| 1,922,429 | Frost | Aug. 16, 1933 |
| 1,965,928 | McGregor | July 10, 1934 |
| 2,528,208 | Bonsack et al. | Oct. 31, 1950 |
| 2,624,565 | Kompart | Jan. 6, 1953 |
| 2,756,138 | Meister | July 24, 1956 |
| 2,782,475 | Wilhelm et al. | Feb. 26, 1957 |
| 2,787,536 | Spedding et al. | Apr. 2, 1957 |

OTHER REFERENCES

"Steel," Mar. 2, 1942, page 85.

UNITED STATES PATENT OFFICE

CERTIFICATE OF CORRECTION

Patent No. 2,882,142 April 14, 1959

John H. Keating

It is hereby certified that error appears in the printed specification of the above numbered patent requiring correction and that the said Letters Patent should read as corrected below.

Column 1, line 71, for "embody" read -- embodying --; column 2, line 9, for "with" read -- which --; line 10, for "side" read -- slide --.

Signed and sealed this 22nd day of September 1959.

(SEAL)
Attest:

KARL H. AXLINE
Attesting Officer

ROBERT C. WATSON
Commissioner of Patents